March 7, 1961     K. REINER     2,973,677

INTERNAL WRENCHING TOOLS

Filed July 21, 1958

INVENTOR.
KENNETH REINER
BY T. L. Stam
ATTORNEY

United States Patent Office 2,973,677
Patented Mar. 7, 1961

2,973,677

INTERNAL WRENCHING TOOLS

Kenneth Reiner, Box 2001, Terminal Annex,
Los Angeles 54, Calif.

Filed July 21, 1958, Ser. No. 749,922

3 Claims. (Cl. 81—71)

This invention relates to wrenching means and more specifically to internal wrenching tools of specialized utility for use in wrenching polygonal or hexagonal nuts of hollow-body conformation.

This application is a continuation in part of my co-pending application for "Self-Locking Nut," Serial Number 546,550, filed November 14, 1955, and now abandoned, which co-pending application is directed to hex-nut constructions particularly adapted for use in the aircraft industry by virtue of the combinations of properties of great strength and relatively slight bulk and weight. The weight saving in one modification of such hex-nut configurations is effected in part by the provision of an internally and externally polygonal wrenching surface or apron which is spaced from the threaded nut shank by a recess, the apron and the nut shank being joined by an integral rigid bearing surface or base member.

When such hex-nuts, or standard hex-nuts, are used in places of limited access, it is customary to utilize socket-type wrenches in tightening the nuts. Such socket wrenches, however, usually engage the outer peripheral surfaces of the nut bodies, and have a diameter which is larger than that of the nut, of course, and may therefore not be used in circumstances wherein the clearance is not substantially greater than the diameter of the nut.

With the advent of the nut of my prior application Serial Number 546,550 mentioned hereinabove, and in conjunction with its universal acceptance and extensive use in industry, it became apparent that the said nut had certain advantages other than great strength and light weight. One such advantage resides in the fact that such nuts can be tightened by an internal wrenching tool engaging the inner surface of the polygonal apron of the nut rather than by the usual externally engaging socket wrench, thus making it possible to install such nuts under more restrictive space limitations than were previously possible. The present invention is directed to an internal wrenching tool which is particularly adapted for this purpose.

It is, therefore, an object of this invention to provide novel internal wrenching means for tightening hollow-bodied polygonal nuts whereby such nuts may be installed in extremely limited spaces.

A further object of this invention is to provide means for wrenching nut bodies comprised of a central threaded shank and a spaced polygonal apron separated by a base member, to provide a recess, said means comprising wrenching means adapted to engage the internal wall of said apron and to accommodate said threaded shank and a bolt head extending through said shank.

Still another object of this invention is to provide internal wrenching means for tightening hollow-bodied polygonal nuts, said means being capable of holding the nut, either magnetically or non-magnetically, while placing it in assembled relation, the wrenching means being of less external peripheral size than the said nut.

Yet another object of this invention is to provide a wrenching tool or bit adapted for the internal wrenching of hollow-bodied nuts but having a portion of standard nut size so that it may be manipulated by standard size tools.

These and other objects and many of the attendant advantages of this invention will be readily appreciated as the same becomes better understood by reference to the following detailed description when considered in connection with the accompanying drawing, wherein.

Figure 4:
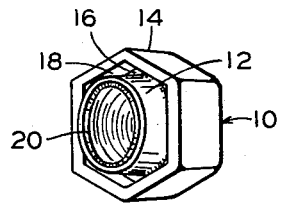
Figure 4 is a perspective view of a hollow-bodied hex-nut of the type with which the novel wrenching tool of Figures 1 to 3 is used.

Referring now to the drawing wherein like reference numerals are appended to like parts throughout, attention is first directed to Figure 4 which is a showing of a hollow-bodied nut of the type with which the novel wrenching tool disclosed herein may be used. Such nuts, as disclosed in my aforementioned prior application, comprise a one-piece metallic body 10 having a threaded sleeve 12, which usually has a slight external taper, and a spaced upturned polygonal relatively rigid apron 14, which, in the exemplary illustration, is shown to be in the common hexagonal configuration. A base 16 integrally attaches the bottom of the threaded sleeve to the bottom of the apron to provide a recess 18 between the sleeve and the apron.

Figure 5:
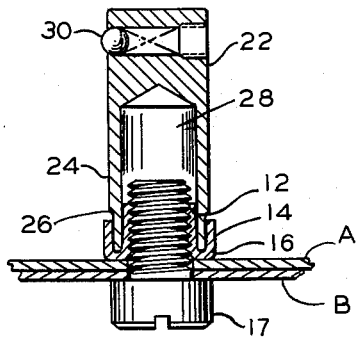
Figure 5 is a central vertical sectional view of the wrenching tool as assembled with a hex-nut in applying the nut to a threaded bolt.

The nut, as described, is a prevailing torque type nut, the base 16 thereof serving as a bearing surface to clamp panels A and B between itself and the head 17 of a threaded bolt, the threading of the bolt into the nut being from the base end, as shown in Figure 5. In such usage the recess 18 faces outwardly from the surface of the panel to which the threaded fastening is being applied and is thus adapted to be tightened by internal wrenching means. While for the purposes of this invention the presence or absence of locking means in the threaded sleeve is immaterial, the nut, as herein disclosed for illustrative purposes, is the identical lock-nut disclosed in my prior application and is shown as having deformed threads at the elliptical free end, as at 20, for locking purposes, while the starting threads, at the base, are perfect in conformation. Obviously the wrenching tool of the present invention may be used with any nut having an outwardly directed recess such as the recess 18, whether the threaded sleeve has a locking portion or not.

Figure 2:
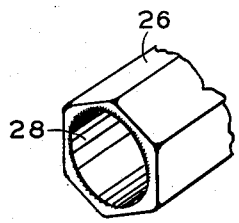
Figure 2 is an enlarged perspective view of the nut engaging end of the wrenching tool of Figure 1.
Figure 1:
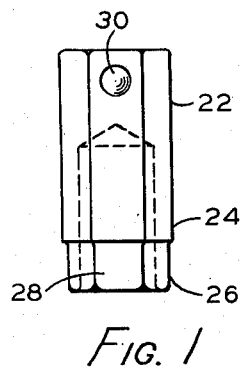
Figure 1 is a front elevation of a wrenching tool according to the present invention including a dotted line showing of the central pocket in the tool.
Figure 3:
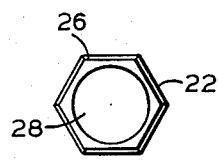
Figure 3 is a bottom view of Figure 1.

Referring now to Figures 1 to 3, the wrenching tool may comprise a solid body of generally right prismatic configuration with the ends in the desired polygonal shape, as for example, hexagonal. If desired the body may be of constant outer periphery throughout its length but certain added novel advantages are attained by providing a stepped outer configuration, as shown at 24 in the drawing, to provide a wrenching surface at the nut engaging end 26 of the wrenching tool and a handle portion 22 of different size. The outer peripheral dimension of the nut engaging portion 26 is determined by the inner dimension of the apron 14 of the nut for each size and is so chosen that the outer surface of the said portion 26 may be closely accommodated within the apron 14 for the application of wrenching force to the nut.

The wrenching tool is provided with a central longitudinal cylindrical bore or cavity 28 opening into the end face of the nut engaging end 26 thereof, as shown in the drawing. The cavity 28 is of a lateral extent to accommodate the threaded sleeve 12 and of a length to receive the sleeve and the protruding ends of bolts to which it is expected that the nuts will be threaded.

The internal wrenching configuration thus far described embodies the basic teaching of the present invention, i.e. a structure comprising an outer polygonal wrenching surface and an internal cavity whereby the internal threaded sleeve of a hollow-bodied nut and the protruding end of a bolt extending through the nut may be accommodated in the cavity while the wrenching surface engages the inner surface of the wrenching apron of the nut. Such constructions, aside from the basic advantage in providing internal wrenching to permit utilization of the nuts in restricted areas, also have the attendant inherent advantage that they have the greatest concentration of material at the points or corners of the tool where wrenching forces are applied to the nut rather than being thinnest in those areas as is true in the internally polygonal-externally circular configuration of standard socket wrenches.

Another ancillary advantage of the novel construction of the present invention resides in the fact that it makes it possible to provide a means for frictionally holding the nuts in the tool without resort to magnetism as previously resorted to for such purposes. This is of extreme importance in airframe or instrument construction wherein it is sometimes essential that residual magnetism in the finished assemblies be kept at a minimum.

Figure 6:
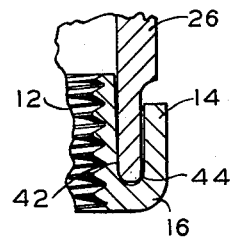
Figure 6 is an enlarged section of a fragment of Figure 5, showing how the wrenching tool makes frictional contact with the sleeve and with the wrenching apron of the nut.

The aforementioned frictional holding feature is best described in conjunction with Figure 6 which is an enlarged fragmentary showing of a nut assembled with a wrenching tool according to the present invention. As shown in Figure 6, the types of nuts intended to be used with the present invention are characterized by their lightness and resilience. In configuration they are characterized by the fact that the nut shank or sleeve 12 is necessarily externally tapered in configuration, as illustrated in Figure 6, from a larger diameter at the bottom of the recess 18 to a smaller diameter at the free top end of the sleeve. In view of the stated configuration of the subject nut bodies the wrenching tool of the present invention is made of such a thickness as to be relatively closely received in the recess between the nut sleeve and its hex apron thus providing frictional holding between the wrenching tool and the nut. By virtue of the tapered nature of the threaded sleeve 12 of the nut, the inner wall of the nut engaging end 26 is easily received in the recess at the top of the nut but is brought increasingly into contact with the outer wall of the larger bottom portion of the tapered sleeve 12 as shown at 42, the resilience of the parts assisting in such insertion and augmenting the frictional forces tending to hold the pieces together. Actually this resilient sliding contact between the inner wall of the wrenching tool and the outer wall of the sleeve of the nut, is, of itself, sufficient to effect a frictional gripping of the nut by the tool. However, it is preferable to make the nut engaging end of the tool body of rounded shape and of such thickness that the outer edge thereof is gradually moved into contact with the inner wall of the wrenching apron at the juncture of the apron with the base, as shown at 44 in Figure 6. There is, therefore a wedging action of the nut body upon the tool as at 42 and 44 to firmly hold the nut body thereon so that magnetism need not be resorted to for use of such tools and nuts in restricted areas.

Attention is now again directed to the stepped nature of the outer configuration of the wrenching tool. As indicated hereinabove the wrenching tool may obviously be made of constant cross-section to achieve the novel nut holding and internal wrenching function previously described. However, the outer periphery of the handle portion is then generally not necessarily of a size to be fitted by standard sockets or wrenches for turning. Accordingly, it is preferable that the handle portion be made of a standard socket size, as shown in the drawing, wherein the nut engaging portion 26 is of a size to fit within the apron 14 of a hollow-bodied nut and the handle portion is of a size to be engaged by standard wrenching tools, as for example, socket wrenches. For this purpose, my novel wrenching tool may be provided with conventional spring and ball retaining means 30 for cooperation with socket type wrenching means in the usual manner.

From the above it may readily be seen that I have provided a novel wrenching tool particularly adapted for the internal wrenching of hollow-bodied nuts said tool being capable of non-magnetically gripping such nuts and of applying them in restricted areas. Moreover, I have provided, in such a wrenching tool, standard size handle means whereby existing standard tools may be used to apply turning forces thereto.

Obviously many modifications and variations of the present invention are possible in the light of the above teachings. For example, within the broadest outlines of my invention the handle of the wrenching tool need not be relatively short and straight, as shown, but may be of greater length or jointed and even of different cross-sectional shape than the nut engaging portion if so desired. Also, the cavity 28 could be a through bore rather than a chamber as shown in the drawing. It is therefore understood that the present invention is not to be limited by the specific example illustrated and described herein but rather by the scope of the appended claims.

What is claimed is:

1. A detachable coupling comprising the combination of a hollow-bodied driven member and a drive means detachably connected thereto; said driven member comprising a central tapered threaded sleeve, a spaced internally polygonal apron and a base integrally connecting said sleeve and said apron to provide a recess therebetween; said drive means comprising a body having an end of polygonal external configuration similar to that of said apron and of a size to fit closely internally of said apron, said body having a cavity in the end face thereof, said cavity being of such a length as to accommodate the length of said sleeve and the protruding end of a bolt to be associated with said sleeve, said cavity being of such cross-section and size as to progressively closely receive said tapered sleeve therein; whereby a maximum thickness of material is provided for applying a driving force to said driven member and whereby the wall of said cavity progressively contacts and grips the tapered sleeve and the exterior of said body engages the interior of said apron whereby a progressively tightening detachable coupling is formed upon insertion of said drive means into said recess.

2. In combination, a driven member and a drive means detachably connected thereto, said drive means comprising a body of polygonal cross-section having an end face with a central cylindrical opening therein to provide an annular wall defining a substantially round axially extending chamber and a polygonal peripheral surface, said driven member comprising a central tapered threaded sleeve and an internally polygonal apron spaced outwardly from said sleeve to form a recess between said sleeve and said apron, the polygonal peripheral surface of said drive means detachably contacting the internal wall of said apron, said sleeve being received in said chamber, the internal cross-sectional dimension of said chamber being such that the wall of the chamber will progressively more tightly contact and grip the tapered threaded sleeve upon assembly of the drive means with the driven member.

3. The combination of claim 2, further characterized in that said end face of the drive means is rounded and in that the outer dimension of the polygonal peripheral surface is such that the internal wall of the polygonal apron of the driven member is contacted by the outer rounded edge of the end face adjacent the bottom of the recess as the annular wall of the chamber of the drive means contacts the tapered threaded sleeve whereby a wedging frictional engagement of the driven member and the drive means is effected.

References Cited in the file of this patent

UNITED STATES PATENTS

| | | |
|---|---|---|
| 1,158,085 | Tennyson | Oct. 26, 1915 |
| 2,119,622 | Freber | June 7, 1938 |
| 2,550,866 | Rosan | May 1, 1951 |
| 2,758,494 | Jenkins | Aug. 14, 1956 |
| 2,813,450 | Dzus | Nov. 19, 1957 |
| 2,817,258 | Stein | Dec. 24, 1957 |

FOREIGN PATENTS

| | | |
|---|---|---|
| 671,087 | Great Britain | Apr. 30, 1952 |